Nov. 3, 1942.                H. E. VOGEL                2,300,820
                              OUTLET GATE
                          Filed Jan. 16, 1939
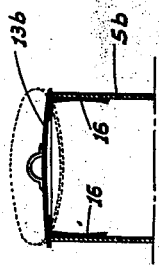
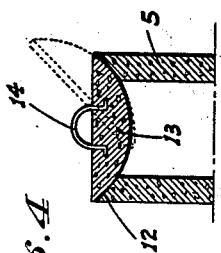
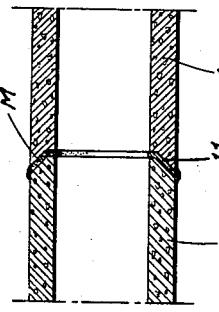
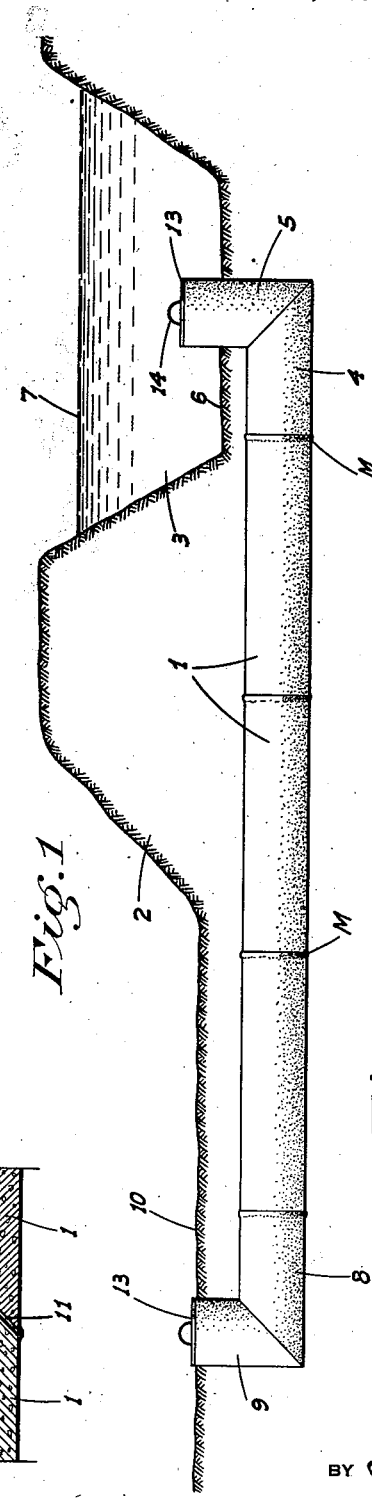
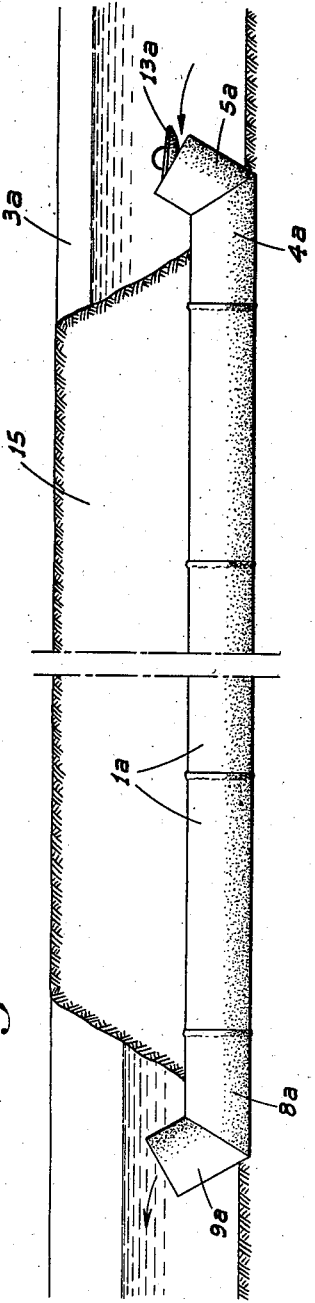
INVENTOR
*H.E. Vogel*
BY
ATTORNEY Patented Nov. 3, 1942

2,300,820

UNITED STATES PATENT OFFICE 2,300,820

OUTLET GATE

Herbert E. Vogel, Fresno, Calif.

Application January 16, 1939, Serial No. 251,135

5 Claims. (Cl. 137—111)

This invention relates in general to equipment for controlling irrigation, and in particular the invention is directed to a device to control the flow of water along or out of an irrigation ditch; the device being intended for use as a substitute for the commonly used head walls or gates. With such head walls or gates, it is difficult to place or remove the same, washing away of the earth around the gates often occurs, and proper volumetric flow cannot always be effectively controlled.

It is therefore the principal object of the present invention to provide a water flow control device which includes no head wall or gate; is arranged for easy placement and removal; affords ready and accurate control of the flow of water; and prevents washing of the earth about the device.

A further object of the invention is to provide a water flow control device including a conduit section at the intake and outlet ends thereof; the said conduit sections each being provided with a lid arranged for manipulation to control the amount of water which may enter such conduit.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a longitudinal elevation of the device illustrating the same as used to control the flow of water from an irrigation ditch to an adjacent field.

Figure 2 is a fragmentary longitudinal elevation of a modified form of the device, illustrating the same as used to control the flow of water along an irrigation ditch.

Figure 3 is an enlarged fragmentary and longitudinal section illustrating the taper fit between adjacent conduit sections.

Figure 4 is an enlarged fragmentary section of one end of the device, and showing the preferred form of flow control lid mounted thereon.

Figure 5 is an enlarged fragmentary section of one end of the device when the same is constructed of metal; a modified form of water control lid being shown in connection therewith.

Referring now more particularly to the characters of reference on the drawing, and particularly at present to the embodiment of the invention shown in Figs. 1, 3 and 4, the device comprises a plurality of horizontal conduit sections 1 embedded in the earth beneath one bank or levee 2 of an irrigation ditch 3, and extending therebeyond at both ends. At one end, the conduit assembly is provided with an elbow section 4 which includes an upstanding portion 5 which terminates at a point above the bottom 6 of the ditch 3 but below the surface 7 of the water in the ditch. At the other end, the conduit assembly is provided with another elbow section 8, which includes an upstanding portion 9 which terminates at its upper end substantially flush with the ground level 10 of the field to be irrigated.

The conduit sections of the assembly are engaged at adjacent ends by means of a taper fit such as shown at 11 in Fig. 3; these conduit sections preferably being made of cast concrete or the like. If desired, a sealing material M may be used between the fitted ends of the conduit sections. The upper ends of the upstanding elbow portions 5 and 9 are each provided with an annular inwardly and upwardly facing taper seat 12 of substantial width. A heavy lid or disc valve 13, having a spherical bottom face, is disposed on the upper end of each of the conduit portions; the spherical bottom face of each disc valve resting in matching or symmetrical relation on the corresponding tapered seat. The spherical bottom face of each lid or disc valve has a radius of curvature of a sphere of substantially greater diameter than the diameter of said lid or of the valve seat; said lid or disc valve being relatively thin at its periphery. The lid 13 may likewise be made of concrete into which a bail 14 is embedded.

To prevent a flow of water through the device in either direction, the lids 13 normally engage the seats 12 about their full circumference. However, if it is desired that water flow from the ditch 3 to the ground level 10 of the field, the lid on the upper end of conduit portion 9 is first removed. Thereafter the lid 13 on the upper end of conduit portion 5 is tilted relative to its seat 12, as shown in dotted lines in Fig. 4, so that the lid does not engage such seat for its full circumference, a sector of the lid projecting through the bore of the seat at an angle thus permitting water from the ditch to flow through the conduit assembly.

As the water flows into the intake end of the conduit assembly at a point some distance below the water level in the ditch, a positive and continuous flow through the conduit assembly is assured, and further, as the upper end of conduit portion 9 terminates at the ground level, water flowing from such outlet end of the assembly has little tendency to wash the ground thereabout, and the water flows onto the field properly.

Due to the shape of the lid, its weight, and the naturally somewhat rough surfaces both of the concrete lid and its cooperating seat, the lid will remain in the position to which it is tilted without the need of any fastening means, and without the flowing water having any displacing action on the lid.

As will be obvious, the above described device may be readily placed in the ground or removed therefrom, as the device constitutes a plurality of readily portable sections.

In the embodiment of the invention shown in Fig. 2, the assembly is substantially that described in connection with Fig. 1, except that in this instance the horizontal conduit assembly, including conduit sections 1a is disposed longitudinally at the bottom of an irrigation ditch 3a, and is then covered, except at its ends, by means of an earth dam 15. Also in this embodiment of the invention, the upstanding conduit portions 5a and 9a of the elbow sections 4a and 8a are shown as disposed at an obtuse angle, as shown, in order to facilitate the flow of water, as shown by the arrows, into and out of such intake and outlet conduit portions. Here again, an effective control of the flow of water along the ditch is accompanied merely by proper manipulation of lid 13a, which is constructed, mounted and used in the same manner as the lid 13 previously described.

In the modification shown in Fig. 5, the conduit assembly is constructed of metal, and the upstanding conduit portion 5b is provided with a circular metallic lid 13b, having opposed depending spring fingers 16 which frictionally engage within the conduit portion 5b. To control the flow of water with this type of lid, the same is tilted in the same manner as described in connection with the lid 13; the spring fingers holding the lid in any adjusted position. With metal caps constructed in this or a similar manner, rough surfaces for holding purposes are of course unnecessary.

While I have here shown the outlet gate as having vertical end elbows and the check gate as having vertical end elbows and the check gate as having angular elbows, it is to be understood that either form of elbow may be used on either or both ends of the different types of gate, as operating and other conditions may render advisable.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A low pressure water outlet gate comprising an upstanding conduit having its upper end formed as an annular, inwardly and upwardly facing taper valve seat, and a freely removable disc valve including a bottom face cooperating with said valve seat in symmetrical and frictional holding relation and of unbroken continuous contour, said bottom face being spherical, the radius of curvature thereof being that of a sphere of substantially greater diameter than the diameter of the valve seat; the peripheral edge of the disc valve being relatively thin and the disc valve being of a diameter such that upon movement of said disc valve from a closed position to a tilted position, a sector thereof of substantial arcuate extent projects angularly through the bore of the valve seat in clearance relation to the wall of the latter.

2. A low pressure water outlet gate as in claim 1 in which the taper valve seat is of substantial width; the disc valve being heavy and the symmetrical cooperating faces of the valve seat and disc valve being rough whereby to establish frictional holding engagement therebetween.

3. A low pressure water outlet gate comprising an upstanding conduit having its upper end formed as an annular inwardly and upwardly facing taper seat of substantial width, and a freely removable disc valve gravitationally supported on said end of the conduit and having a spherical bottom face of unbroken continuous contour in symmetrical engagement with said valve seat for a major portion of its width; the disc valve being heavy and cooperating faces of the valve seat and disc valve being rough whereby to establish frictional holding engagement therebetween.

4. A low pressure water outlet gate as in claim 3 in which the disc valve is relatively thin at its periphery; the diameter of said disc valve being of limited greater diameter than the bore of the valve seat, and the spherical bottom of said disc valve having a radius of curvature of a sphere of substantially greater diameter than the diameter of said valve.

5. A low pressure water outlet gate comprising a disc valve having a spherical bottom face of unbroken continuous contour whose radius of curvature is that of a sphere of substantially greater diameter than that of said valve, and an upstanding conduit having its upper end formed as a taper seat on which said disc valve is gravitationally supported, the spherical bottom face of the valve symmetrically engaging the face of the valve seat; said engaged faces being rough and the disc valve being heavy, whereby to establish frictional holding engagement between the valve and seat.

HERBERT E. VOGEL.